(12) United States Patent
Harada et al.

(10) Patent No.: US 7,295,202 B2
(45) Date of Patent: Nov. 13, 2007

(54) SYSTEM FOR APPROXIMATING AND DISPLAYING THREE DIMENSIONAL CAD DATA, AND SYSTEM FOR EXECUTING METHOD THEREOF

(75) Inventors: Tsuyoshi Harada, Tokyo (JP); Shintaro Nakayama, Tokyo (JP)

(73) Assignees: Toyota Jidosha Kabushiki Kaisha, Aichi-ken (JP); Lattice Technology, Inc., Tokyo (JP)

( * ) Notice: Subject to any disclaimer, the term of this patent is extended or adjusted under 35 U.S.C. 154(b) by 55 days.

(21) Appl. No.: 10/506,762

(22) PCT Filed: Dec. 26, 2003

(86) PCT No.: PCT/JP03/17075

§ 371 (c)(1),
(2), (4) Date: Mar. 11, 2005

(87) PCT Pub. No.: WO2005/066852
PCT Pub. Date: Jul. 21, 2005

(65) Prior Publication Data
US 2006/0139348 A1    Jun. 29, 2006

(51) Int. Cl.
*G60T 17/00* (2006.01)
(52) U.S. Cl. .................... 345/420; 345/423; 345/428
(58) Field of Classification Search ................. None
See application file for complete search history.

(56) References Cited

U.S. PATENT DOCUMENTS 6,130,673 A * 10/2000 Pulli et al. ................. 345/428

(Continued)

FOREIGN PATENT DOCUMENTS

JP        2000-331191        11/2000

(Continued)

OTHER PUBLICATIONS

ATI Technologies White Paper Truform, p. 10.

(Continued)

*Primary Examiner*—Kee M. Tung
*Assistant Examiner*—Andrew Yang
(74) *Attorney, Agent, or Firm*—Konomi Takeshita (57) ABSTRACT

The objective of the present invention is to provide a method for approximating and displaying a three-dimensional object represented by CAD data. In particular, the present invention provides a method for approximating CAD data representing a three-dimensional object, comprising steps of: (a) generating a mesh with mesh lines for approximating each face of the three-dimensional object represented by the CAD data within a rough conversion tolerance with respect to a specified conversion tolerance; (b) approximating a boundary edge surrounding and defining each individual face with a plurality of curves within the specified conversion tolerance, approximating each of the curves with a polyline comprising points and connecting lines within the rough conversion tolerance to define boundary points which are the points of the polylines, and obtaining a vector tangential to the curve at each of the boundary points; (c) generating polygons with three or four vertices by connecting internal points which are points of intersection of the mesh lines inside the boundary edge, and by connecting the boundary points and the internal points that are adjacent to and inside the boundary edge; (d) calculating a vector normal to the face at each of the vertices of each of the polygons, storing information identifying the vertices and the corresponding normal vectors, and storing the tangential vector at each of the boundary points obtained at the step (b); (e) converting each of the polygons with three or four vertices to a triangular or quadrilateral surface by using a plurality of control points obtained by processing the information identifying the vertices, the normal vectors, and the tangential vectors; and (f) examining if each of the triangular or quadrilateral surfaces is close to the face represented by the CAD data within the specified conversion tolerance, and if not, regenerating a mesh with a narrower mesh width and more mesh lines on the face to repeat the steps (c)-(e) and (f). It is preferable that the polygons are triangles.

11 Claims, 7 Drawing Sheets

U.S. PATENT DOCUMENTS 6,356,263 B2 * 3/2002 Migdal et al. .............. 345/423
6,462,738 B1 * 10/2002 Kato ........................... 345/428
6,650,324 B1 * 11/2003 Junkins ....................... 345/423

FOREIGN PATENT DOCUMENTS

JP 2001-27994 1/2001
WO WO98/44591 10/1998

OTHER PUBLICATIONS

Akira Wakita et al, A Compact and Qualified Web3D Representation Based on Lattice Structure, May 2001, p. 12, vol. 42-5.

ATI Technologies White Paper Truform, p. 10, 2001.

* cited by examiner

Vertices and Normal Vectors Information

| 35 | 0 | 1 | 2 | 5 | 1 | 2 | · · · · · · · |
|---|---|---|---|---|---|---|---|
| 36 | $P_0$ | $P_1$ | $P_2$ | $P_5$ | $P_1$ | $P_2$ | · · · · · · · |
| 37 | $N_0$ | $N_1$ | $N_2$ | $N_5$ | $N_1$ | $N_2$ | · · · · · · · |

FIG. 7B

Boundary Points Information

| 1 | 2 | $T_1$ | 2 | 1 | $T_2$ | |
|---|---|---|---|---|---|---|
| 38 | 39 | 40 | | | | |

FIG. 8

SYSTEM FOR APPROXIMATING AND DISPLAYING THREE DIMENSIONAL CAD DATA, AND SYSTEM FOR EXECUTING METHOD THEREOF

FIELD OF THE INVENTION

This invention relates to a system, method, and computer software program for approximating and displaying three-dimensional CAD data.

BACKGROUND OF THE INVENTION

Geometrical and topological data representing three-dimensional components are used in CAD for obtaining mechanical layouts, examining mechanical interferences, etc. primarily in the automotive and aerospace industries. The amount of CAD data generally increases as the degree of details increases, sometimes surpassing the hardware capacity. A PC with Microsoft Windows™ normally has a limited capacity of 2 GB, unable to read in a massive amount of CAD data.

A method for handling such a massive amount of data includes, for example, conversion of a three-dimensional shape to triangles. This type of method approximates a three-dimensional shape with triangles within a specified tolerance with respect to the CAD data precisely representing the three-dimensional shape in terms of geometry and topology. Such a task of generating polygons is generally done by dividing a region into polygonal sections. In this case, however, the data get duplicated because both the CAD data and the polygons data need to be held in the memory. In addition, dividing a region into polygonal sections requires a significant amount of processing load; thus, it takes a longer real time.

In order to circumvent the disadvantages as above, numerous methods have been proposed. In one method, for example, once-obtained polygons data are stored in the memory and called when a real time display of the geometrical shape is needed, thereby eliminating recalculation. However, when high accuracy is required, that is, when the errors of the polygons data with respect to the original CAD data are required to be small, the amount of the polygons data increases tremendously, slowing down the display processing each time a viewing direction is changed. The amount of data increases exponentially with the inverse of the required tolerance value, that is, the smaller the required tolerance is, the more drastically the amount of data increases.

Therefore, a method for displaying a three-dimensional object represented by CAD data, wherein the memory size is small, accuracy is satisfactory, and the data can be read in fast, is desired.

SUMMARY OF THE INVENTION

In view of the above circumstances, the present invention provides a method for approximating and displaying a three-dimensional object represented by CAD data, wherein the CAD data, which is often too complex to be displayed because of the limited memory capacity, are approximated to be displayed on a PC and the like.

According to a first aspect of the present invention, there is provided a method for approximating CAD data representing a three-dimensional object, comprising steps of: (a) generating a mesh with mesh lines for approximating each face of the three-dimensional object represented by the CAD data within a rough conversion tolerance with respect to a specified conversion tolerance; (b) approximating a boundary edge surrounding and defining each individual face with a plurality of curves within the specified conversion tolerance, approximating each of the curves with a polyline comprising points and connecting lines within the rough conversion tolerance to define boundary points which are the points of the polylines, and obtaining a vector tangential to the curve at each of the boundary points; (c) generating polygons with three or four vertices by connecting internal points which are points of intersection of the mesh lines inside the boundary edge, and by connecting the boundary points and the internal points that are adjacent to and inside the boundary edge; (d) calculating a vector normal to the face at each of the vertices of each of the polygons, storing information identifying the vertices and the corresponding normal vectors, and storing the tangential vector at each of the boundary points obtained at the step (b); (e) converting each of the polygons with three or four vertices to a triangular or quadrilateral surface by using a plurality of control points obtained by processing the information identifying the vertices, the normal vectors, and the tangential vectors; and (f) examining if each of the triangular or quadrilateral surfaces is close to the face represented by the CAD data within the specified conversion tolerance, and if not, regenerating a mesh with a narrower mesh width and more mesh lines on the face to repeat the steps (c)-(e) and (f). It is preferable that the polygons are triangles.

According to one embodiment of the present invention, the above method further comprises a step of (g) joining adjacent two polygons from different faces across the boundary edge by identifying the boundary points common to both of the polygons.

According to the above configuration, the CAD data are converted to triangular or quadrilateral polygons within the rough conversion tolerance, so that the amount of data to handle is reduced. Further, by converting the polygons to triangular or quadrilateral surfaces as above, it is possible to display the object in detail with the relatively small amount of the polygons data. Furthermore, since the boundary edges are approximated by processing the original curves represented by the CAD data and the tangential vectors, there is no gap across the boundary edge. Therefore, a detailed display can be attained with the relatively small amount of data to handle.

According to another embodiment of the present invention, in the step (e) above, the control points between two internal points are generated by use of the normal vector at each of the internal points, the control points between one internal point and one boundary point are generated by use of the normal vector at each of the internal and boundary points, and the control points between two boundary points are generated by use of the tangential vector at each of the boundary points.

According to yet another embodiment of the present invention, the above method further comprises steps of: (h) tessellating each of the surfaces into sub-polygons, the surfaces having been generated by using the control points obtained by processing the information identifying the vertices, the normal vectors, and the tangential vectors stored at the step (d); and (i) displaying a three-dimensional shape comprised of the sub-polygons.

According to a second aspect of the present invention, there is provided a a method for displaying a three-dimensional object represented by CAD data, comprising steps of: (j) receiving and storing information identifying the vertices and the corresponding normal vectors for each of the polygons, and the tangential vector at each of the boundary points; (k) tessellating each of the surfaces into sub-polygons, the surfaces having been generated by using the control points obtained by processing the information identifying the vertices, the normal vectors, and the tangential vectors stored at the step (j); and (l) displaying a three-dimensional shape comprised of the sub-polygons.

It is preferable that the above display method further comprises a step of (m) display switching, which comprises steps of: acquiring display conditions including display shapes and sizes; determining whether or not a detailed display be performed depending on the display conditions; and executing the steps (j)-(l), if it is determined that the detailed display be performed, or displaying the polygons based on the information stored at the step (j), otherwise.

According to the above configuration, by converting the polygons to triangular or quadrilateral surfaces as above, it is possible to display the object in detail with the relatively small amount of the polygons data. Furthermore, since the boundary edges are approximated by processing the original curves represented by the CAD data and the tangential vectors, there is no gap across the boundary edge. Therefore, a detailed display can be attained with the relatively small amount of data to handle.

DETAILED DESCRIPTION OF THE PREFERRED EMBODIMENTS

Embodiments of the present invention are described below with reference to the accompanying drawings to facilitate understanding of the present invention.

Figure 1:
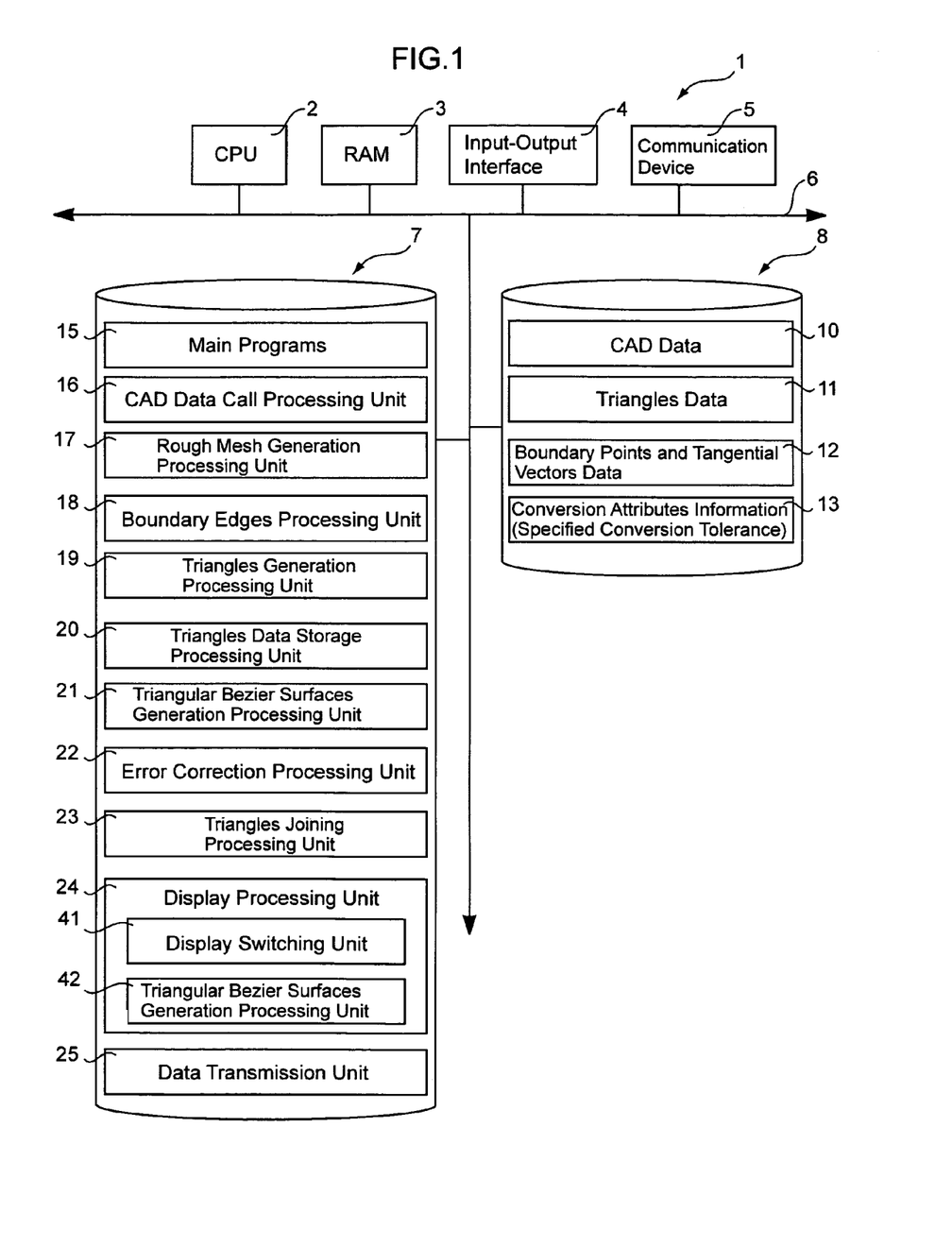
FIG. 1 is a block diagram schematically showing a system according to one embodiment of the present invention.

FIG. 1 is a block diagram showing a computer system 1 according to one embodiment. In the computer system 1, a CPU 2, a RAM 3, an input-output interface 4, a communication device 5, a program storage unit 7, and a data storage unit 8 are connected to a bus 6.

As shown in this figure, the data storage unit 8 stores CAD data 10 to be processed, triangles data 11 generated through the processing method according to the present embodiment, boundary points and tangential vectors data 12 generated through the processing method according to the present embodiment, and conversion attributes information 13 such as a specified conversion tolerance.

The program storage unit 7 stores main programs 15 such as an OS, a CAD data call processing unit 16, a rough mesh generation processing unit 17, a boundary edges processing unit 18, a triangles generation processing unit 19, a triangles data storage processing unit 20, a triangular Bezier surfaces generation processing unit 21, an error correction processing unit 22, a triangles joining processing unit 23, a display processing unit 24, and a data transmission unit 25.

These elements 15-25 stored in the program storage unit 7 are actually computer software programs written in a predetermined programming language stored in the memory, and are called onto the RAM 3 and executed by the CPU 2 whenever appropriate.

Figure 2:
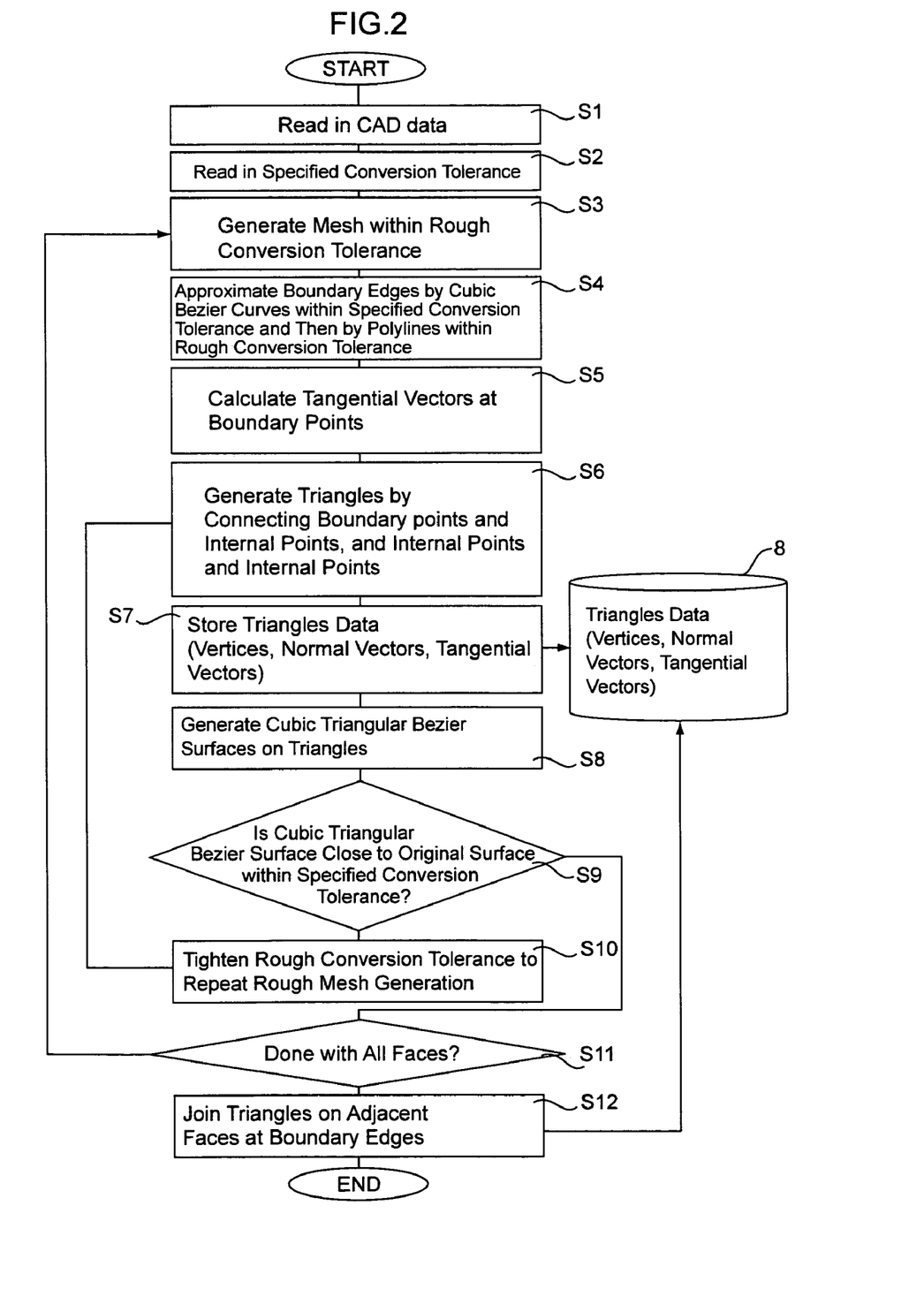
FIG. 2 is a flowchart schematically showing a process according to one embodiment of the present invention.

FIG. 2 is a flowchart showing processing steps carried out by the system as below.

CAD Data Call Processing Unit 16:

The CAD data call processing unit 16 calls the CAD data 10 stored in the data storage unit 8 onto the RAM 3 according to a predetermined data format (Step S1). The CAD data comprise geometry data (POINT/CURVE/SURFACE), topology data (BODY/SHELL/FACE/EDGE/VERTEX), assembly structures, features, attributes data, etc. The system may be structured such that only necessary parts are called consecutively.

Rough Mesh Generation Processing Unit 17:

In this process, a mesh is generated to approximate the original shape represented by the CAD data 10 with accuracy of one order of magnitude lower than the desired accuracy specified by a conversion tolerance. For example, when the conversion tolerance required by a user is 0.01 mm, the rough conversion tolerance is determined to be 0.1 mm by a predetermined algorithm.

In order to perform this task, the rough mesh generation processing unit 17 extracts the specified conversion tolerance from the conversion attributes information 13 in the data storage unit 8 (Step S2). It is designed such that a user can specify the conversion tolerance via a predetermined interface, and the specified conversion tolerance is stored in the data storage unit 8.

Figure 3:
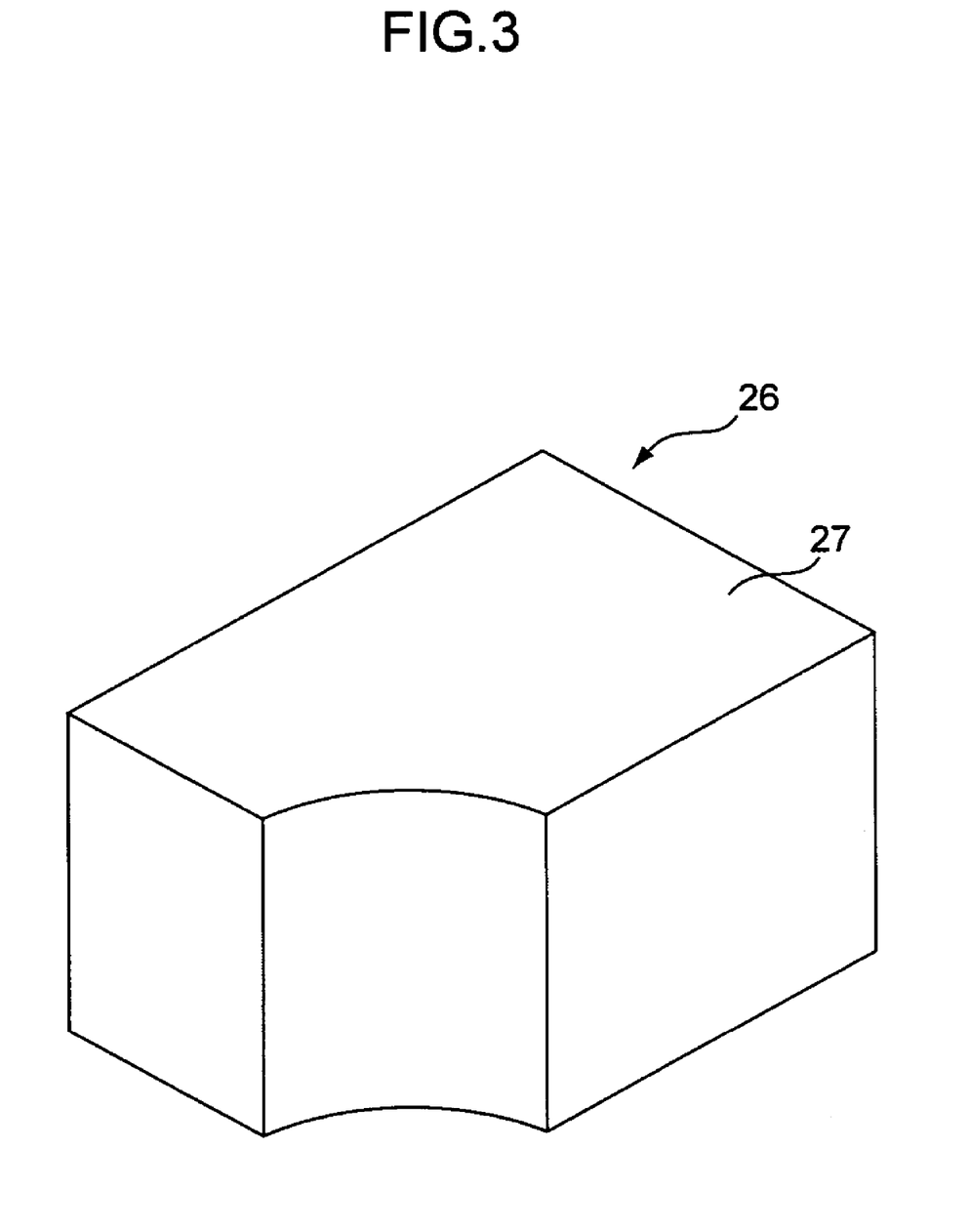
FIG. 3 is a perspective view of a three-dimensional object represented by CAD data.
Figure 4A:
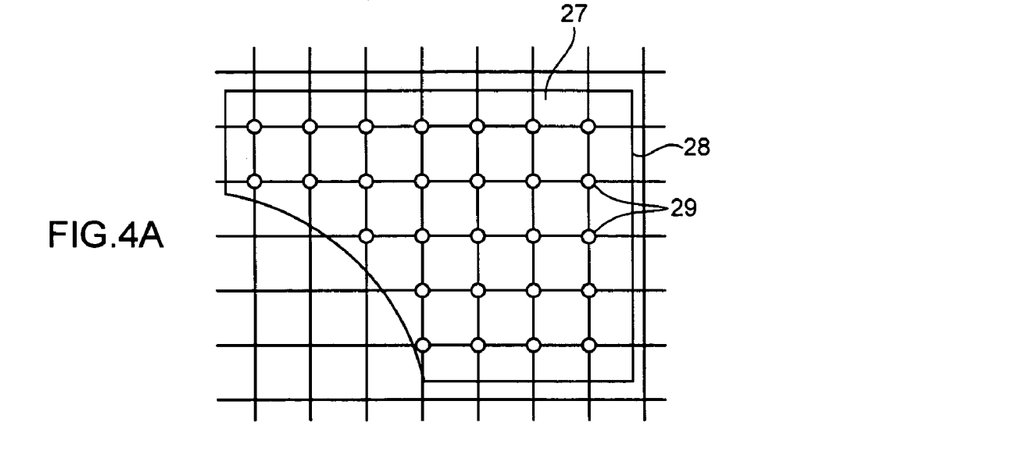
FIGS. 4A, 4B, and 4C schematically shows a process of generating a mesh which divides each of the faces of the three-dimensional object into triangles.

Thereafter, the rough mesh generation processing unit 17 generates a mesh which approximates each face of the original three-dimensional object within the above rough conversion tolerance (Step S3). FIG. 3 shows an example of a three-dimensional object 26 for which the CAD data 10 are stored. FIG. 4A shows a mesh which divides one of the faces 27 of the three-dimensional object 26 into mostly quadrilaterals. The curve surrounding the face 27 is a boundary edge 28. The points of intersection of mesh lines inside the boundary edge 28 are indicated by open circles, and are hereinafter referred to as internal points 29.

Figure 4B:
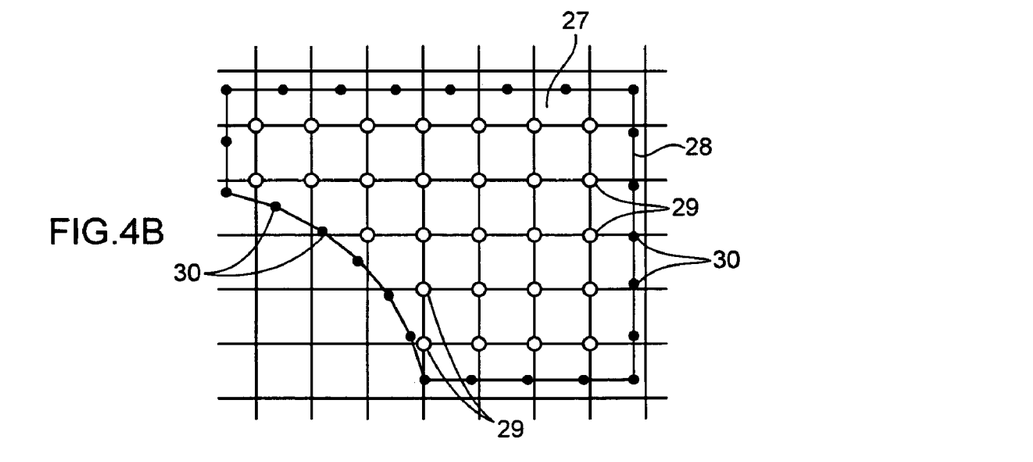

Boundary Edges Processing Unit 18:

The boundary edges processing unit 18 approximates the boundary edge 28 with a plurality of cubic Bezier curves within the specified conversion tolerance. Then, each of the cubic Bezier curves is approximated by a polyline comprising points and connecting lines within the rough conversion tolerance (Step S4). The points of the polylines are indicated by solid circles in FIG. 4B, and are hereinafter referred to as boundary points 30. Furthermore, the boundary edges processing unit 18 calculates a vector tangential to the cubic Bezier curve at each of the boundary points (Step S5).

Figure 4C:
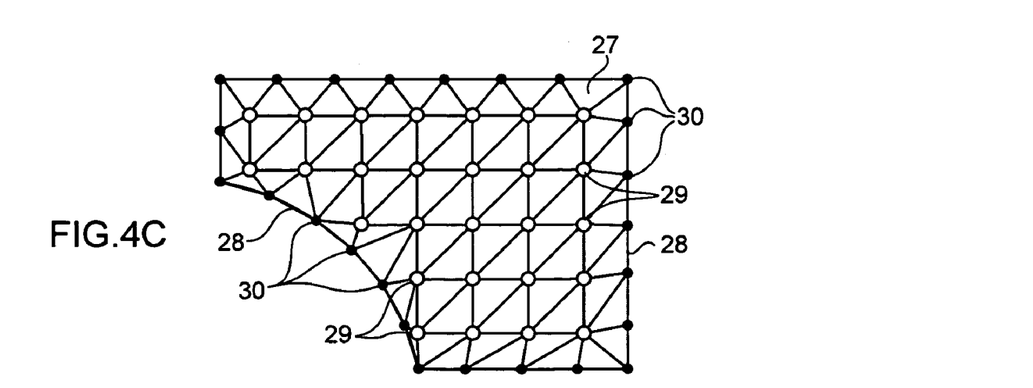

Triangles Generation Processing Unit 19:

The triangles generation processing unit 19 divides the face 27 into triangles (Step S6) by connecting the internal points and the boundary points as shown in FIG. 4C. The internal points 29 are connected to each other regularly as in the mesh. The boundary points 30 and the internal points 29 just inside the boundary edges are connected to form triangles by adding new lines which are generally off the regular mesh.

Triangles Data Storage Processing Unit 20:

After the above procedure is carried out for each face 27, the triangles data storage processing unit 20 calculates a vector normal to the shape (surface) of the face 27, as represented by the original CAD data, at each of the vertices of each of the triangles (the internal points 29 and the boundary points 30). The information identifying the vertices and the corresponding normal vectors for each triangle is stored as the triangles data 11. In addition, the triangles data storage processing unit 20 stores the information identifying the boundary points 30 neighboring to each boundary point 30 as well as the tangential vector at each of the boundary points 30, which was calculated at the Step S5, as the boundary points and tangential vectors data 12 (Step S7).

Figure 5A:
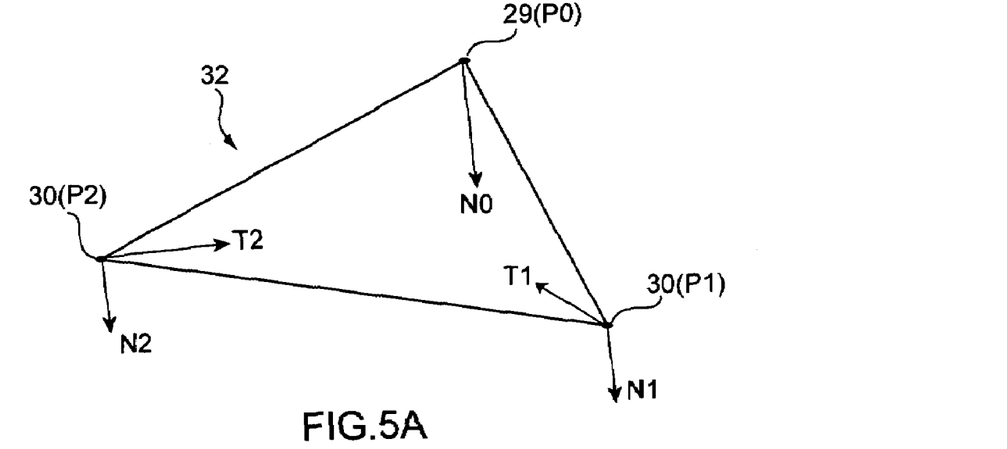
FIGS. 5A and 5B schematically shows a process of generating control points based on a triangle to obtain a triangular Bezier surface.

FIG. 5A shows an example of a triangle 32, which has an internal point 29 (P0) and two boundary points 30 (P1 and P2) for the vertices. The internal point P0 has a normal vector N0, the boundary point P1 has a normal vector N1, and the boundary point P2 has a normal vector N2. In addition, the boundary point P1 has a tangential vector T1, and the boundary point P2 has a tangential vector T2.

Triangular Bezier Surfaces Generation Processing Unit 21:

The triangular Bezier surfaces generation unit 21 generates a cubic triangular Bezier surface on the triangle 32 by processing the information on the normal vectors N0, N1, and N2, and the tangential vectors T1 and T2 (Step S8). The method to generate a triangular Bezier surface is described in detail in ATI Technology White Paper: http://ati.com/products/pdf/truform.pdf (2001). The entire disclosure of this material is incorporated herein by reference.

In the above reference, ten control points to form a triangular Bezier surface are generated by use of the normal vector at each vertex of a triangle. In contrast, in the present embodiment, the control points between internal points are generated by use of the normal vector at each of the internal points; the control points between an internal point and a boundary point are generated by use of the normal vector at each of the internal and boundary points; and the control points between boundary points are generated by use of the tangential vector at each of the boundary points.

The control points between boundary points may be generated, for example, in such a way that the control point close to each of the boundary points is at ⅓ the length of the tangential vector from the boundary point.

Figure 5B:
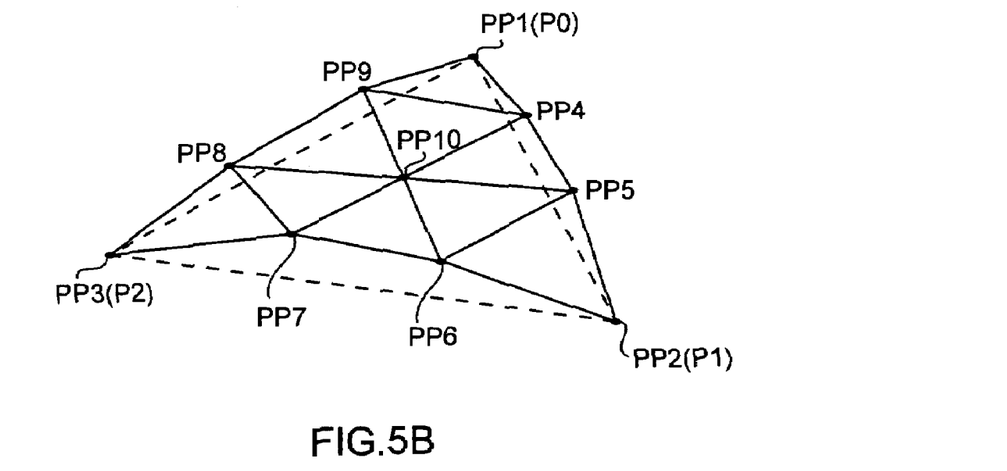

Through the above procedure, two control points are generated between each pair of the points. As shown in FIG. 5B, nine out of the ten control points to form a cubic triangular Bezier surface are determined to be PP1, PP2, and PP3 which correspond to the three vertices P0, P1, and P2, and PP4-PP9 which correspond to the six control points obtained along the triangular edges. The last control point PP10 is determined through averaging the nine control points.

Error Correction Processing Unit 22:

The error correction processing unit 22 examines if the generated triangular Bezier surface is close to the original surface represented by the original CAD data within the specified conversion tolerance (Step S9).

First of all, the vertices PP1-PP3 are on the original surface by definition. Thus, the midpoint on each of the edges of the triangular Bezier surface as well as the center point of the triangular Bezier surface are examined to see if they are close to the original surface within the specified conversion tolerance. The boundary edges processing unit 18 have approximated the boundary edge 28 for each face with the cubic Bezier curves within the specified conversion tolerance. Therefore, these curves, including the midpoints between two boundary points, are supposed to be close to the original surface within the specified conversion tolerance.

After the examination, if any one of these points is outside the specified conversion tolerance, the rough conversion tolerance is tightened and the mesh width is narrowed to repeat the rough mesh generation (Step S10). However, the process of approximating the boundary edges in Step 4 is not repeated here. The above Steps S6-S10 are repeated until all the points become close to the original surface within the specified conversion tolerance.

Triangles Joining Processing Unit 23:

After the above steps, if it is determined that the points on each face are close to the original surface within the specified conversion tolerance, the triangles joining processing unit 23 join the triangles on adjacent faces at the boundary edges (Step S12).

A three-dimensional object represented by CAD data generally has one face on each side of a boundary edge. The boundary edges processing unit 18 is carried out using only the original CAD data for the boundary edges (curves), not the shapes of the faces (surfaces). Therefore, the triangles on both sides of the boundary edge can be connected without any gap.

Figure 6A:
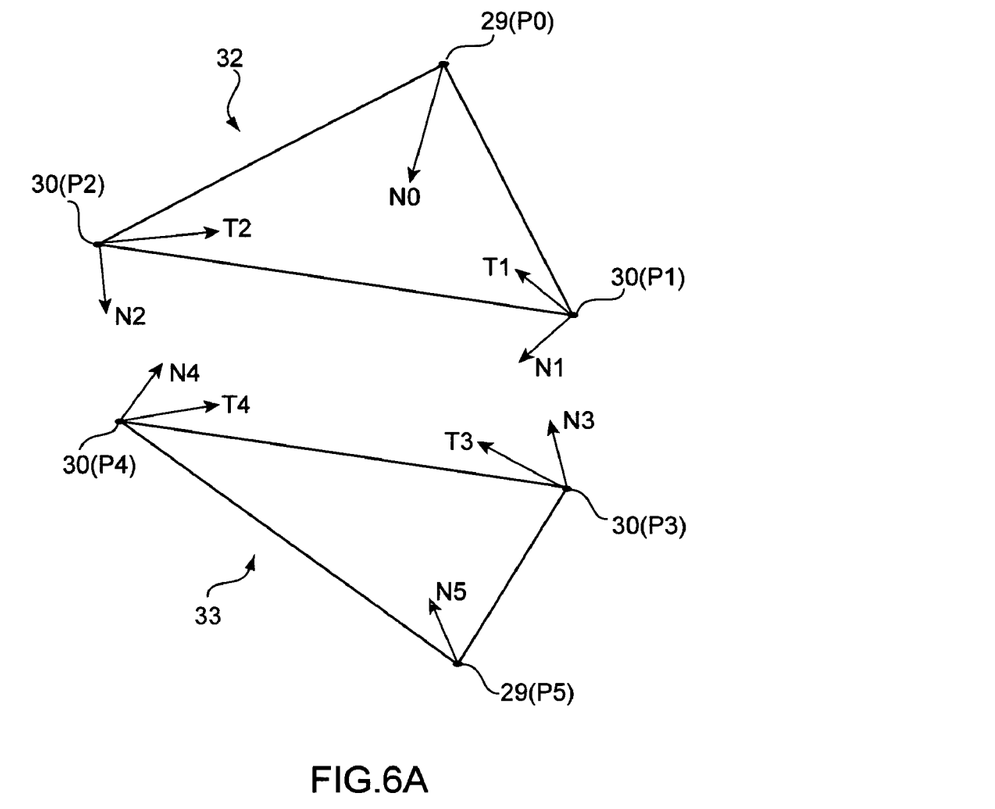
FIG. 6A schematically shows two adjacent triangles across a boundary edge which separates two adjacent faces of the three-dimensional object.
Figure 6B:
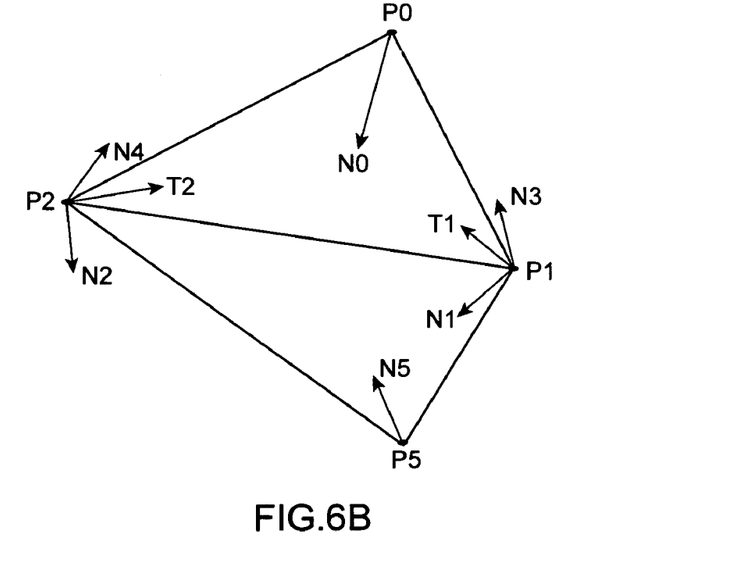
FIG. 6B schematically shows the two adjacent triangles which are joined at the boundary edge.

FIG. 6A shows two adjacent triangles 32 and 33 separated by a boundary edge. The triangle 32 is the aforementioned triangle with vertices P0, P1, and P2. The triangle 33 belongs to another face which shares the same boundary edge with the face for which the triangle 32 is generated. The triangle 33 has an internal point P5, two boundary points P3 and P4, and normal vectors N3, N4, and N5 at P3, P4, and P5 respectively. Here, the boundary points P3 and P4 are identical to P1 and P2 respectively. The tangential vectors T3 and T4 are identical to T1 and T2 respectively according to the Steps S4 and S5. Therefore, the triangles joining processing unit 23 joins the triangles 32 and 33 at the common boundary edge by replacing P3 and P4 with P1 and P2.

Figure 7A:
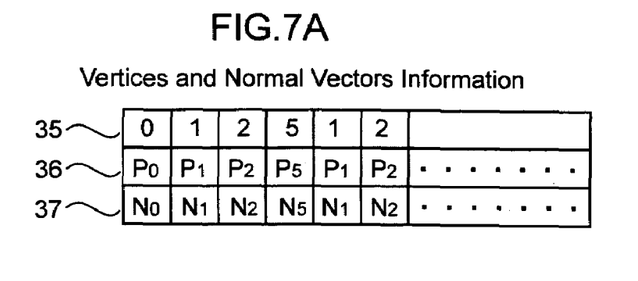
FIG. 7 schematically shows the way in which data are stored according to one embodiment of the present invention.
Figure 7B:
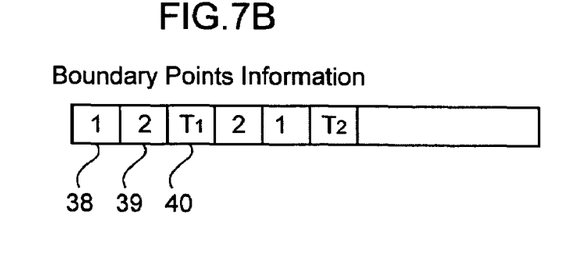

An example of the triangles data format in the data storage unit 8 is shown in FIG. 7. As shown in FIG. 7A, an index number 35 is assigned to each vertex with a corresponding vertex information 36 and a corresponding normal vector 37. FIG. 7B shows each pair of the neighboring boundary points 38 and 39 represented by the index numbers, and the tangential vector 40 at the boundary point 38.

After the above processes, the original CAD data are converted to the triangles data described by the internal points with respective normal vectors, the boundary points with respective normal vectors, each boundary point having the normal vectors as many as the number of the faces around it, and the neighboring pairs of boundary points with corresponding tangential vectors. The triangles data storage processing unit 20 performs the above data storing task.

According to the present system, the triangles data are generated within the rough conversion tolerance. Thus, although the data volume is small, a highly accurate display can be attained by converting the data into the cubic triangular Bezier surfaces.

Figure 8:
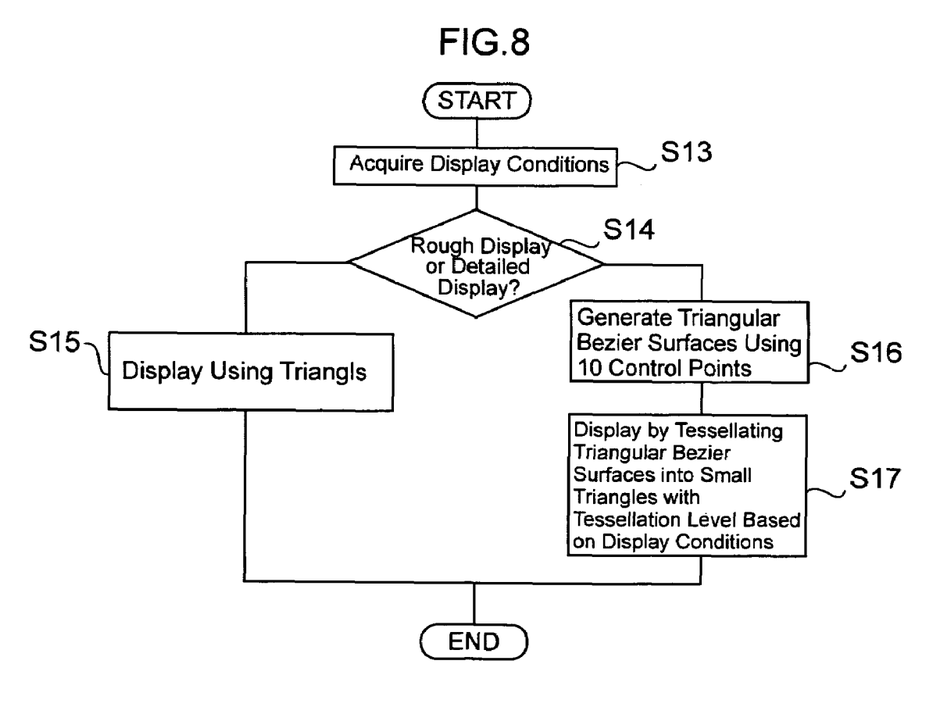
FIG. 8 is a flowchart schematically showing a process of displaying the object shape according to one embodiment of the present invention.

FIG. 8 is a flowchart showing the display process carried out by the display processing unit 24.

Display Processing Unit 24:

The display processing unit 24 comprises a display switching unit 41 and a triangular Bezier surfaces generation processing unit 42. The display switching unit 41 switches a display method between a rough display and a detailed display. The triangular Bezier surfaces generation processing unit 42 operates for the detailed display.

The display processing unit 24 acquires system conditions necessary for display, i.e. display conditions, from the system (Step S13). These display conditions include, but not limited to, sizes of displayed objects, resolutions (number of vertical and horizontal pixels), magnification rates, degrees of displayed details, etc.

Thereafter the display switching unit 41 determines which one of the rough display or detailed display be performed depending on the display conditions (Step S14). For this step, for example, a threshold value may be specified for each item in the display conditions to set the criteria. If the rough display is chosen, the triangles and the normal vectors generated at Steps S6 and S7 are used for display (Step S15).

The determination at Step S14 should be made depending on sensory quality of the picture displayed with use of the triangles generated within the rough conversion tolerance. For example, if the display area is small compared to the screen, the picture will not look so rugged even if the triangles generated within the rough conversion tolerance are used. Therefore, such determination criteria may be incorporated in an algorithm for choosing the display method.

When the picture looks rugged with use of the triangles generated within the rough conversion tolerance, the triangular Bezier surfaces generation processing unit 42 operates to produce the detailed display (Steps S16 and S17). In this case, the triangular Bezier surfaces generation processing unit 42 generates triangular Bezier surfaces based on the normal as well as the tangential vectors. See Step S16 and FIG. 5B. Thereafter, the triangular Bezier surfaces are subdivided into small triangles. The level of subdivision (tessellation) is determined based on the sensory quality, i.e., whether or not the picture looks smooth. That is, the level of tessellation is determined based on the display conditions such as the size of a displayed object, the resolution (number of vertical and horizontal pixels), the magnification rate, etc., in comparison with the predetermined threshold values for each display.

Figure 5C:
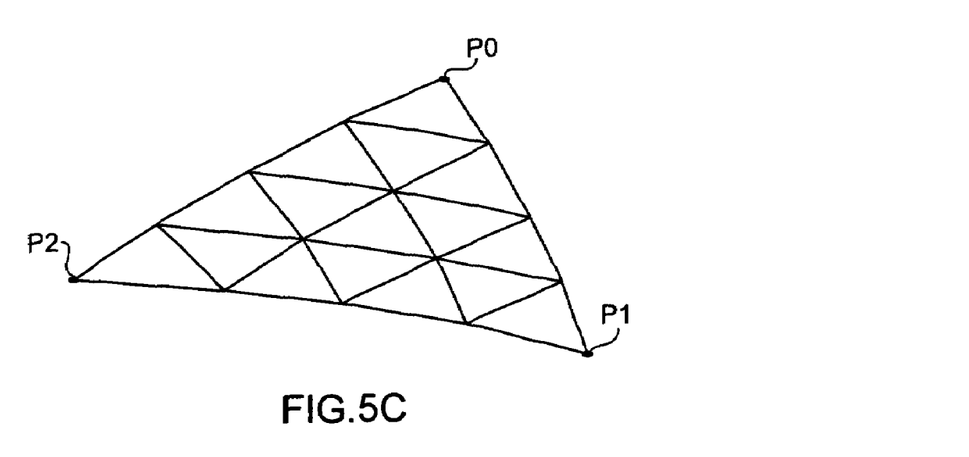
FIG. 5C conceptually shows a step of tessellating the surface into small triangles.

FIG. 5C is a conceptual diagram showing an example of tessellating the surface into 16 small triangles. (This corresponds to Level 3 tessellation wherein each edge is subdivided into four pieces.) The triangular Bezier surfaces generation unit 42 obtains a normal vector at each vertex of each of the small triangles by linearly interpolating the normal vectors at the vertices P0, P1, and P2 of the original triangle. The object is displayed using these small triangles and the normal vectors (Step S17).

According to the above processes, a highly accurate display can be attained based on the triangular Bezier surfaces for the case of a detailed display. In particular, the process of joining two adjacent triangles at the boundary edge is already taken into account; thus, there will be no gap at the boundary edge even when the degree of display details increases.

Data Transmission Unit 25

The data transmission unit 25 transmits the data generated at Steps S1-S12 to other computers or memory media via internet or intranet, for example. A computer which receives the data may be configured to have only a playback program compatible with the display processing unit 24 for data rendering, display, and operation.

While the invention has been so described, the present invention is not limited to the present embodiments and can be modified variously without departing from the spirit and scope of the invention, According to the above embodiment, triangles are used to approximate the CAD data for a three-dimensional object. Instead, for example, quadrilaterals may be used. In this case, quadrilateral Bezier surfaces may be employed in place of the triangular Bezier surfaces.

According to the above embodiment, the order of the Bezier surfaces is taken to be third. However, any order may be taken, and thus the number of the control points may not be limited to 10.

Furthermore, instead of Bezier surfaces for approximating triangles or quadrilaterals, B-spline surfaces or NURBS surfaces may be used.

We claim:

1. A method for approximating CAD data representing a three-dimensional object, by approximating each face of the three-dimensional object with triangular or quadrilateral surfaces within a specified conversion tolarance, comprising steps of:

(a) generating a mesh with mesh lines for approximating each face of the three-dimensional object represented by the CAD data within a rough conversion tolerance with respect to a specified conversion tolerance;

(b) approximating a boundary edge surrounding and defining each individual face with a plurality of curves within the specified conversion tolerance, approximating each of the curves with a polyline comprising points and connecting lines within the rough conversion tolerance to define boundary points which are the points of the polylines, and obtaining a vector tangential to the curve at each of the boundary points;

(c) generating polygons with three or four vertices by connecting internal points which are points of intersection of the mesh lines inside the boundary edge, and by connecting the boundary points and the internal points that are adjacent to and inside the boundary edge;

(d) calculating a vector normal to the face at each of the vertices of each of the polygons, storing information identifying the vertices and the corresponding normal vectors, and storing the tangential vector at each of the boundary points obtained at the step (b);

(e) converting each of the polygons with three or four vertices to a triangular or quadrilateral surface respectively, by using a plurality of control points obtained by processing the information identifying the vertices, the normal vectors, and the tangential vectors; and (f) examining if each of the triangular or quadrilateral surfaces is close to the face represented by the CAD data within the specified conversion tolerance, and if not, regenerating a mesh with a narrower mesh width and more mesh lines on the face to repeat the steps (c)-(e) and (f); and generating a mesh with mesh lines for approximating each face of the three-dimensional object within a rough conversion tolerance with respect to a specified conversion tolerance, approximating a boundary edge surrounding and defining each individual face with plurality of curves within the specified conversion tolerance, and approximating each of the curves with a polyline comprising points and connecting lines within the rough coversion tolerance to define boundary points which are the points of the polylines, for obtaining polygons to be used for approximating each face of the three-dimensional object with triangular or quadrilateral surfaces with the specified conversion tolerance;

examining if each of the triangular or quadrilateral surfaces is close to the face represented by the CAD data within the specified conversion tolerance; and if not, regenerating a mesh with a narrower mesh width and more mesh lines on the face to obtain polygons;

(m) display switching, comprising steps of:

acquiring display conditions including display shapes and sizes;

determining whether or not a detailed display be performed depending on the display conditions; and executing steps (i)-(I), if it is determined that the detailed display be performed, or displaying the polygons by use of the polygons data, otherwise, wherein the steps (i)-(I) are:

(i) receiving and storing information identifying vertices and corresponding normal vectors for each of the polygons, and a tangential vector at each of the boundary points;

(k) tessellating each of the surfaces into sub-polygons, the surfaces having been generated by using control points obtained by processing the information identifying the vertices, the normal vectors, and the tangential vectors stored at the step (i); and (I) displaying a three-dimensional shape comprised of the sub-polygons, wherein in the step (e), the control points between two internal points are generated by use of the normal vector at each of the internal points, the control points between one internal point and one boundary point are generated by use of the normal vector at each of the internal and boundary points, and the control points between two boundary points are generated by use of the tangential vector at each of the boundary points.

2. The method for approximating CAD data representing a three-dimensional object according to claim 1, further comprising a step of (g) joining adjacent two polygons from different faces across the boundary edge by identifying the boundary points common to both of the polygons.

3. The method for approximating CAD data representing a three-dimensional object according to claim 1, wherein the polygons are triangles.

4. The method for approximating CAD data representing a three-dimensional object according to claim 1, wherein the curve is a Bezier curve.

5. The method for approximating CAD data representing a three-dimensional object according to claim 1, wherein the surface is a Bezier surface.

6. The method for approximating CAD data representing a three-dimensional object according to claim 1, further comprising steps of:

(h) tessellating each of the surfaces into sub-polygons, the surfaces having been generated by using the control points obtained by processing the information identifying the vertices, the normal vectors, and the tangential vectors stored at the step (d); and (i) displaying a three-dimensional shape comprised of the sub-polygons.

7. The method for displaying a three-dimensional object represented by CAD data according to claim 1, wherein the polygons are triangles.

8. The method for displaying a three-dimensional object represented by CAD data according to claim 1, wherein the curve is a Bezier curve.

9. The method for displaying a three-dimensional object represented by CAD data according to claim 1, wherein the surface is a Bezier surface.

10. A computer readable medium encoded with a computer program for use in a computer system for approximating CAD data representing a three-dimensional object by approximating each face of the three-dimensional object with triangular or quadrilateral surfaces within a specified conversion tolerance, comprising:

a command for generating a mesh with mesh lines for approximating each face of the three-dimensional object represented by the CAD data within a rough conversion tolerance with respect to the specified conversion tolerance;

a command for approximating a boundary edge surrounding and defining each individual face with a plurality of curves within the specified conversion tolerance, approximating each of the curves with a polyline comprising points and connecting lines within the rough conversion tolerance to define boundary points which are the points of the polylines, and obtaining a vector tangential to the curve at each of the boundary points;

a command for generating polygons with three or four vertices by connecting internal points which are points of intersection of the mesh lines inside the boundary edge, and by connecting the boundary points and the internal points that are adjacent to and inside the boundary edge;

a command for calculating a vector normal to the face at each of the vertices of each of the polygons, storing information identifying the vertices and the corresponding normal vectors, and storing the tangential vector at each of the boundary points;

a command for converting each of the polygons with three or four vertices to a triangular or quadrilateral surface respectively, by using a plurality of control points obtained by processing the information identifying the vertices, the normal vectors, and the tangential vectors;

a command for examining if each of the triangular or quadrilateral surfaces is close to the face represented by the CAD data within the specified conversion tolerance, and a command for regenerating a mesh with a narrower mesh width and more mesh lines on the face to repeat the above commands if the condition in which the CAD data is within the specified conversion tolerance is not met;

a command for generating a mesh with mesh lines for approximating each face of the three-dimensional object within a rough conversion tolerance with respect to a specified conversion tolerance, approximating a boundary edge surrounding and defining each individual face with a plurality of curves within the specified conversion tolerance, and approximating each of the curves with a polyline comprising points and connecting lines within the rough conversion tolerance to define boundary points which are the points of the polylines, for obtaining polygons to be used for approximating each face of the three-dimensional object with triangular or quadrilateral surfaces within the specified conversion tolerance;

a command for examining if each of the triangular or quadrilateral surfaces is close to the face represented by the CAD data within the specified conversion tolerance; and-a command for regenerating a mesh with a narrower mesh width and more mesh lines on the face to obtain polygons, if the condition in which the CAD data is within the specified conversion tolerances is not met, and a display switching command stored in the computer memory medium, comprising:

a command for acquiring display conditions including display shapes and sizes;

a command for determining whether or not a detailed display be performed depending on the display conditions; and a command for issuing a detailed display command, if it is determined that the detailed display be performed, or for displaying the polygons by use of the polygons data, otherwise, wherein the detailed display command includes:

a command for receiving and storing information identifying vertices and corresponding normal vectors for each of the polygons, and a tangential vector at each of the boundary points;

a command for tessellating each of the surfaces into sub-polygons, the surfaces having been generated by using control points obtained by processing the information identifying the vertices, the normal vectors, and the tangential vectors; and a command for displaying a three-dimensional shape comprised of the sub-polygons, wherein the command for converting each of the polygons with three or four vertices to a triangular or quadrilateral surface respectively includes a command for generating the control points between two internal points by use of the normal vector at each of the internal points, generating the control points between one internal point and one boundary point by use of the normal vector at each of the internal and boundary points, and generating the control points between two boundary points by use of the tangential vector at each of the boundary points.

11. The computer program product for use in a computer system for approximating CAD data representing a three-dimensional object according to claim 10, further comprising:

a command for joining adjacent two polygons from different faces across the boundary edge by identifying the boundary points common to both of the polygons.

* * * * *